UNITED STATES PATENT OFFICE.

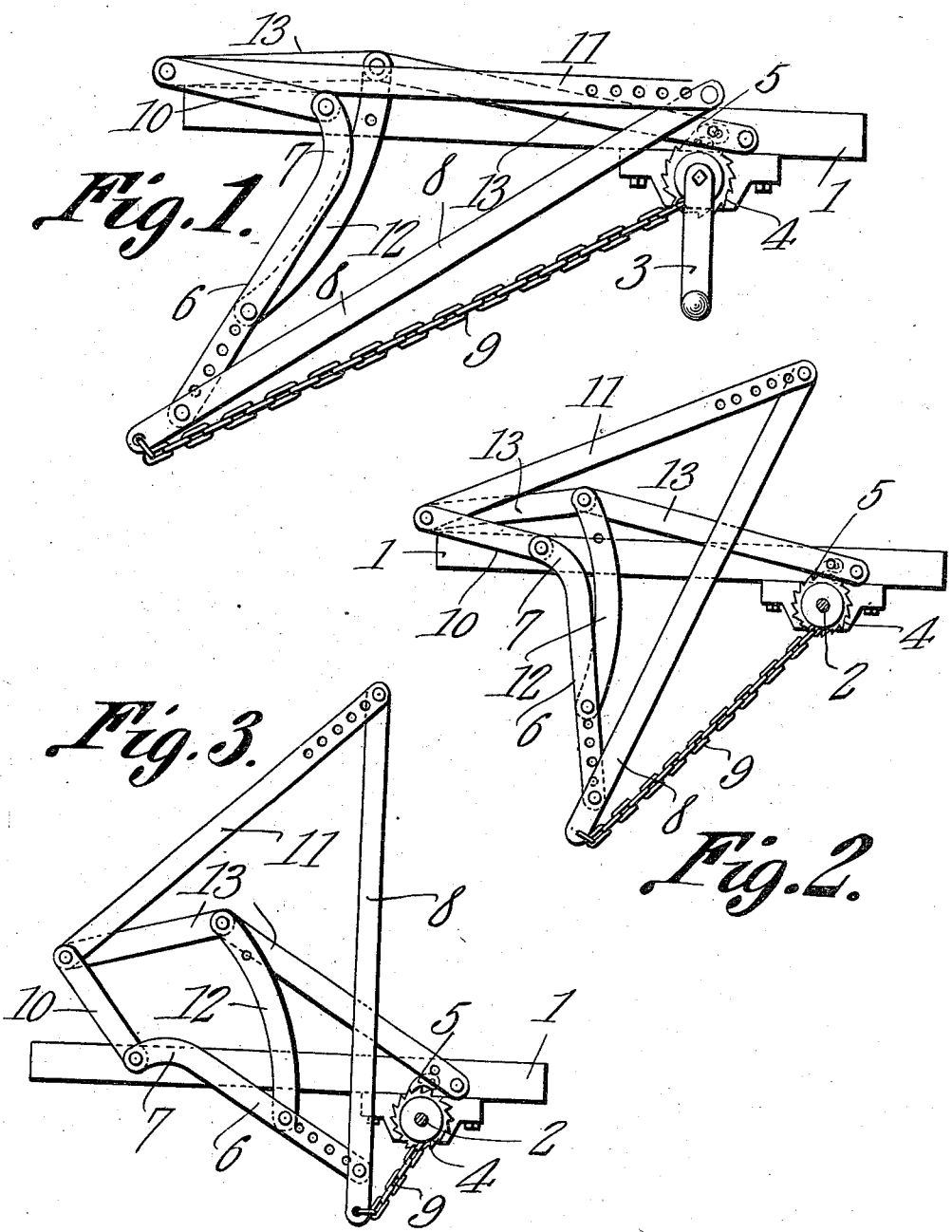

EARL P. LE GORE, OF PHILADELPHIA, PENNSYLVANIA.

WAGON-BODY-DUMPING MECHANISM.

973,055.  Specification of Letters Patent.  Patented Oct. 18, 1910.

Application filed March 14, 1910. Serial No. 549,092.

*To all whom it may concern:*

Be it known that I, EARL P. LE GORE, a citizen of the United States, residing at Philadelphia, in the county of Philadelphia and State of Pennsylvania, have invented a new and useful Wagon-Body-Dumping Mechanism, of which the following is a specification.

This invention relates to a wagon body dumping mechanism and it consists in the novel construction and arrangement of its parts as hereinafter shown and described.

The object of the invention is to provide a simple and an effective mechanism for dumping a wagon body of the box type and with this object in view the mechanism consists in providing means for first tilting the wagon body approximately at its rear end and then elevating and moving the body as an entirety in an upward and forward direction while the tilting movement is continued.

By providing means adapted to move the body in the peculiar manner indicated during the process of dumping the same it is possible to position the body upon the running gear of the wagon in such manner that when the body is swung or moved to the limit of its dumping position the wagon structure is not unbalanced nor does the wagon or the body take up an excessive amount of space.

In the accompanying drawings:—Figure 1 is a side elevation of the mechanism showing the parts collapsed; Fig. 2 is a side elevation of the mechanism showing the parts thereof partially extended; Fig. 3 is a side elevation of the mechanism showing the parts thereof extended to the limit.

Inasmuch as the mechanisms are duplicated at the opposite sides of a wagon a description and illustration of one of the mechanisms will answer for both. The side beam 1 forms a portion of the bed of the wagon running gear and is such as is usually applied. A windlass 2 is journaled to the beam 1 and may be turned by means of a detachable crank handle 3. A ratchet wheel 4 is fixed to the windlass 2 and a holding pawl 5 is pivoted to the side beam 1 and is adapted to engage the periphery of the ratchet wheel 4 in the usual manner. A link 6 is curved at its upper end as at 7 and the curved extremity of the said link is pivotally connected to the rear portion of the side of the beam 1. A lever 8 is pivoted at a point in the vicinity of its lower end to the lower end of the said link 6 and the lower end of a draw chain 9 is connected with the lever 8 at a point below its pivotal connection with the link 6 and the upper end of the said chain 9 is arranged to wind upon the windlass 2. A link 10 is pivotally connected at its lower end to the beam 1 at the same point at which the upper end of the link 6 is pivotally connected therewith and a link 11 pivotally connects the upper end of the link 10 with the upper end of the lever 8. The wagon body (not shown) is mounted upon the link 11. The movement of the link 11 will indicate the movement to which the body of the wagon is subjected it being presumed that the rear end of the body of the wagon is approximately at the same point as the rear end of the link 11.

A curved link 12 is pivotally connected at its lower end with the link 6 at a point between the pivoted upper end of the said link 6 and its point of connection with the lever 8. The upper end of the link 12 is pivotally connected with the pivotal connection point between toggle links 13. The forward end of the forward toggle link 13 is pivotally connected to the side of the beam 1 and the rear end of the rear toggle link 13 is pivotally connected with the links 10 and 11 at their point of pivotal connection.

From the above description taken in connection with the accompanying drawings it will be seen that when the parts are in the position as shown in Fig. 1 of the drawings that the wagon body will be approximately horizontal or parallel with the beam 1. When in such position the body is in load containing position. When it is desired to empty the body of its load the windlass 2 is rotated whereby the chain 9 is wound thereon and the lower end of the lever 8 is drawn toward the windlass 2. Thus the wagon body is tilted and the load may begin to fall therefrom. As the chain 9 is continued to be wound upon the windlass 2 the lower portion of the link 6 is swung in a forward direction and thus the curved link 12 is moved longitudinally which in turn will swing the intermediate portions of the toggle links 13 in an upward direction and inasmuch as the forward end of the forward toggle link 13 is pivoted to a fixed point on the beam 1 the rear toggle link 13 is moved in a forward direction and at the same time in an upward direction. This movement on the part of the rear toggle link 13 will swing the link 10 in an upward direction at its rear end upon the pivotal connection between the link 10 and the link 6. Thus at the completion of the dumping movement of the body mounted upon the link 11 the said body is moved in an upward and a forward direction. Therefore the portion of the load which is emptied last from the body is deposited close to the rear end of the running gear.

Having described the invention what I claim as new and desire to secure by Letters-Patent is:—

1. A wagon body dumping mechanism comprising a beam, a winding device located thereon, a link pivoted at its end to the beam, a lever fulcrumed at a point between its ends to the lower end of said link, a flexible member connected with said lever at a point below its pivotal connection with said link and adapted to wind upon said winding device, a link pivotally connected with the beam at the same point as the pivotal point of the first said link, a link pivotally connected at its rear end with the second mentioned link and pivotally connected at its forward end with the upper end of said lever, toggle links pivotally connected together one of said links pivoted at its forward end to the said beam and the other said link pivoted at its rear end with the second and third mentioned links at their points of pivotal connection and a link pivotally connected with the first mentioned link and pivotally connected with the toggle links at their points of pivotal connection.

2. A wagon body dumping mechanism comprising a link curved at its upper portion and pivoted at its upper extremity to a beam, a lever fulcrumed at a point in the vicinity of its lower end to the lower end of the said link, means for swinging said lever attached to the lower end thereof, a second link pivotally connected with the beam at the same point as the first said link, a third link pivotally connected at its rear end with the second link and pivotally connected at its forward end to the upper end of said lever, toggle links pivotally connected together, the forward end of the forward toggle link being pivoted to the beam, the rear end of the rear link being pivotally connected with the second and third mentioned links at their point of pivotal connection, and a link pivotally connected with the first mentioned link and the toggle links at their points of pivotal connection.

In testimony that I claim the foregoing as my own, I have hereto affixed my signature in the presence of two witnesses.

EARL P. LE GORE.

Witnesses:
ADALINE W. VAN GUNTEN,
WALTER F. HENRY.